US009419898B2

(12) United States Patent
Salter

(10) Patent No.: US 9,419,898 B2
(45) Date of Patent: Aug. 16, 2016

(54) NETWORK MANAGEMENT ASSEMBLY FOR MANAGING A FLOW OF NETWORK MANAGEMENT TRAFFIC

(75) Inventor: Robert John Salter, Christchurch (GB)

(73) Assignee: BAE SYSTEMS PLC, London (GB)

( * ) Notice: Subject to any disclaimer, the term of this patent is extended or adjusted under 35 U.S.C. 154(b) by 241 days.

(21) Appl. No.: 14/000,291

(22) PCT Filed: Feb. 14, 2012

(86) PCT No.: PCT/GB2012/050320
§ 371 (c)(1),
(2), (4) Date: Jan. 24, 2014

(87) PCT Pub. No.: WO2012/110795
PCT Pub. Date: Aug. 23, 2012

(65) Prior Publication Data
US 2014/0204750 A1    Jul. 24, 2014

(30) Foreign Application Priority Data

Feb. 18, 2011  (EP) ..................................... 11275030
Feb. 18, 2011  (GB) ................................... 1102863.6

(51) Int. Cl.
*H04L 12/801* (2013.01)
*H04L 12/24* (2006.01)
*H04L 29/08* (2006.01)

(52) U.S. Cl.
CPC ................ *H04L 47/10* (2013.01); *H04L 41/28* (2013.01); *H04L 67/125* (2013.01)

(58) Field of Classification Search
CPC ....... H04L 47/10; H04L 67/125; H04L 41/28; H04L 63/20
See application file for complete search history.

(56) References Cited

U.S. PATENT DOCUMENTS 5,805,072 A     9/1998  Kakemizu
2002/0105928 A1*  8/2002  Kapoor .................. H01Q 1/246
                                                           370/334

(Continued)

FOREIGN PATENT DOCUMENTS

EP         1162787 A2    12/2001
WO    WO 2004/047402 A1   6/2004

OTHER PUBLICATIONS

International Search Report (PCT/ISA/210) issued on Apr. 19, 2012, by the European Patent Office as the International Searching Authority for International Application No. PCT/GB2012/050320.
United Kingdom Search Report for GB 1102863.6 dated Jun. 17, 2011.

(Continued)

*Primary Examiner* — Jackie Zuniga Abad
(74) *Attorney, Agent, or Firm* — Maine Cernota & Rardin

(57) ABSTRACT

A network management assembly is disclosed for managing a flow of network management traffic across a network containing a plurality of discrete network domains. The assembly can include a first management terminal which is arranged to transmit network management traffic to each of the network domains via a respective first communication link, and a second management terminal which is arranged to receive network management traffic from each of the network domains via a respective second communication link. Each of the first communication links can permit a flow of network management traffic from the first management terminal to a respective domain, and prevent a reverse flow of network management traffic from the respective domain to the first management terminal. Each of the second communication links can permit a flow of network management traffic from a respective domain to the second management terminal, and prevent a reverse flow.

18 Claims, 3 Drawing Sheets

(56) References Cited

U.S. PATENT DOCUMENTS

| | | |
|---|---|---|
| 2002/0129142 A1 | 9/2002 | Favier et al. |
| 2004/0025016 A1* | 2/2004 | Focke et al. .................. 713/164 |
| 2005/0005023 A1 | 1/2005 | Dobbins et al. |
| 2006/0072456 A1 | 4/2006 | Chari et al. |
| 2006/0150243 A1 | 7/2006 | French et al. |

OTHER PUBLICATIONS

Written Opinion (PCT/ISA/237) issued on Apr. 19, 2012, by the European Patent Office as the International Searching Authority for International Application No. PCT/GB2012/050320.

European Search Report for EP 11275030.2 dated Jul. 25, 2011.

* cited by examiner

NETWORK MANAGEMENT ASSEMBLY FOR MANAGING A FLOW OF NETWORK MANAGEMENT TRAFFIC

The present invention relates to a network management assembly for managing a flow of network management traffic.

When configuring a communications network, it is necessary to communicate management traffic over the network, to suitably plan, configure and monitor the various network devices to ensure correct operation of the network. The management traffic thus comprises information relating to the set-up and operation of the network.

In situations where the communications network is arranged to support secure communications between parties it is desirable to manage the flow of management traffic over the network, to control the type of management traffic which is communicated over a particular network link, since this may otherwise enable a hostile party to acquire information about the network from a particular link. This is a particular requirement when the network comprises a secure communication network for coalition forces in a battle scenario, since any information gleaned about the network by an enemy may compromise the coalition strategy.

In accordance with the present invention as seen from a first aspect, there is provided a network management assembly for managing a flow of network management traffic across a network comprising a plurality of discrete network domains, the assembly comprising:

a first management terminal which is arranged to transmit network management traffic to each of the network domains via a respective first communication link;

a second management terminal which is arranged to receive network management traffic from each of the network domains via a respective second communication link; wherein, each of the first communication links are arranged to permit a flow of network management traffic from the first management terminal to the respective domain and prevent a flow of network management traffic from the respective domain to the first management terminal, and each of the second communication links are arranged to permit a flow of network management traffic from the respective domain to the second management terminal and prevent a flow of network management traffic from the second management terminal to the respective domain.

The assembly is thus arranged to separate and isolate the flow of management traffic along specific communication links to minimise the exposure of a particular link to information about the network. The unidirectional flow of traffic along specific links further restricts the information which may be obtained about the entire network from a specific link.

Preferably, each of the first communication links is arranged to pass management traffic relating to a configuration of assets, namely electronic hardware associated with the respective domain, from the first management terminal to the respective domain.

Preferably, each of the second communication links is arranged to pass management traffic relating to a status of assets, namely electronic hardware, associated with the respective domain, from the respective domain to the second management terminal.

The second terminal is preferably arranged to monitor the status of the assets associated with each network domain to provide a global status of the assets associated with the network.

Preferably, the first management terminal is communicatively coupled with the second management terminal via a third communications link. The third communications link preferably permits a flow of management traffic from the first management terminal to the second management terminal but prevents a flow of management traffic from the second management terminal to the first management terminal. The third communications link is arranged to pass management traffic relating to a configuration of assets, namely electronic hardware associated with the respective domain, such that the second management terminal can compare the status of the assets with their intended configuration.

Each of the first and second communications links preferably comprise a processor having a memory for buffering a flow of management traffic along the respective link.

Preferably, the assembly further comprises a first and second user access terminal communicatively coupled with the first and second management terminal, respectively. The first user access terminal is further communicatively coupled with each of the processors.

Preferably, the assembly further comprises a switch which is arranged to separately and selectively enable a user to separately communicatively couple the first user access terminal with the first management terminal or one of the processors.

The assembly preferably further comprises a domain separation assembly which is arranged to receive management traffic from one or more of the network domains and communicate management traffic along the respective second communications link associated with the domain to the second management terminal. Preferably, the domain separation assembly is further arranged to receive management traffic from one or more of the first communication links for subsequent transmission to the respective network domain.

In accordance with the present invention as seen from a second aspect, there is provided a network management interface for managing a flow of network management traffic across a network comprising a plurality of sub-networks, each sub-network comprising a plurality of discrete domains associated with the network, the interface comprising a network management assembly according to the first aspect, and a domain separation assembly which is arranged to receive management traffic from the network domains of the sub-networks and communicate management traffic along the respective second communications link of said network management assembly to the second management terminal, and which is further arranged to receive management traffic from one or more of the first communication links of said network management assembly for subsequent transmission to the respective network domain associated with a sub-network of the network.

Preferred features of the network management interface of the second aspect may comprise one or more of the preferred features of the network management assembly of the first aspect.

In accordance with the present invention as seen from a third aspect, there is provided a management traffic communications network, the network comprising a plurality of sub-networks, each sub-network comprising a plurality of domains associated with the network, each sub-network comprising a network management assembly according to the first aspect for configuring and monitoring assets associated with the domains of the respective sub-network, the network further comprising a network management interface of the second aspect communicatively coupled with at least one management assembly associated with each sub-network, for configuring and monitoring assets associated with the domains of the network.

The network domains preferably comprise security domains.

Further preferred features of the management traffic communications network may comprise one or more of the preferred features of the network management assembly of the first aspect and/or one or more of the preferred features of the network management interface of the second aspect.

An embodiment of the present invention will now be described by way of example only and with reference to the accompanying drawings, in which.

Figure 1:
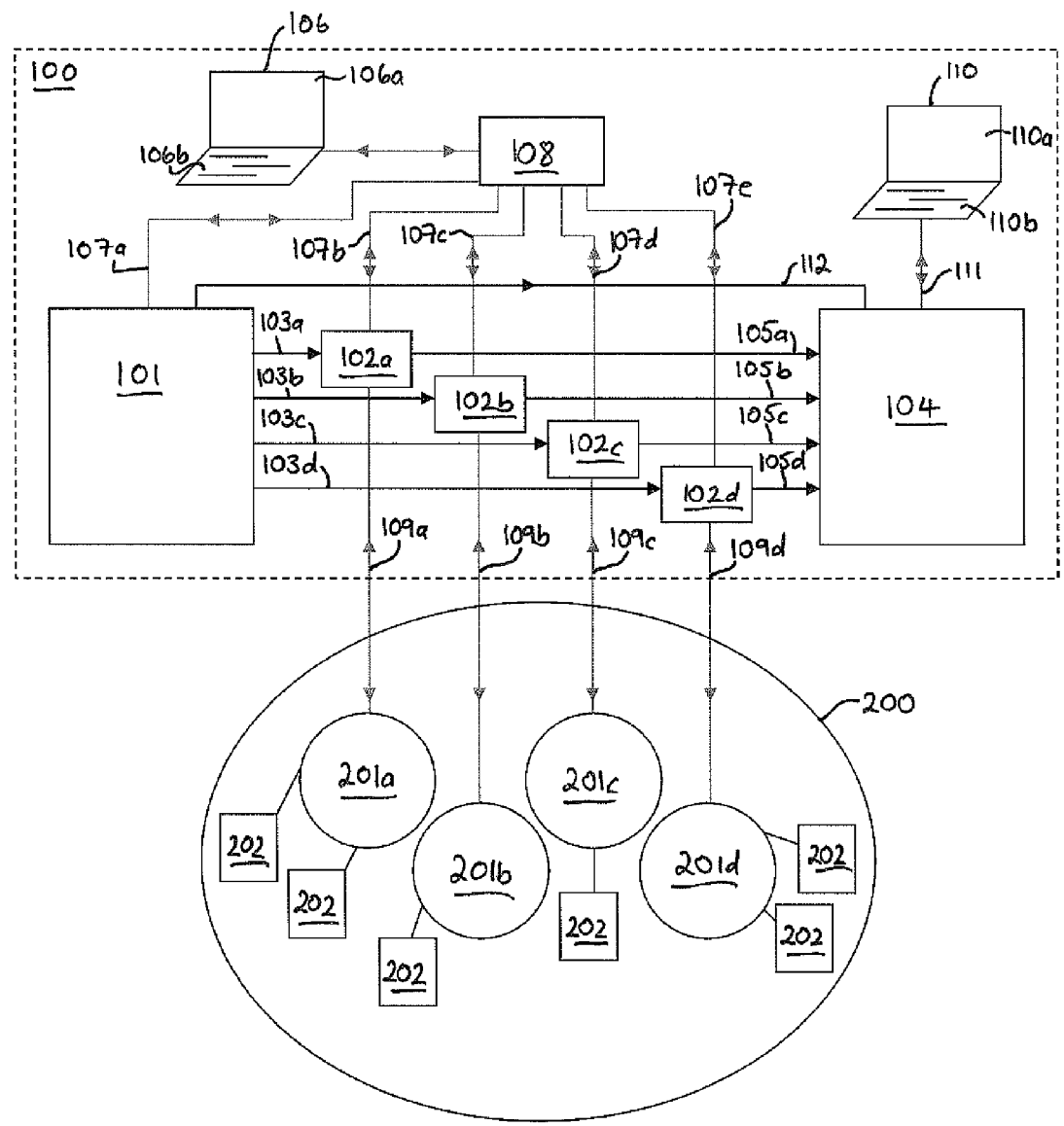
FIG. 1 is a schematic illustration of a network management assembly according to an embodiment of the present invention.

Referring to FIG. 1 of the drawings, there is illustrated a network management assembly 100 according to an embodiment of the present invention, which is arranged to manage a flow of network management traffic across a local network 200 comprising a plurality of network domains 201a-d. In this embodiment, the domains 201a-d may comprise security domains which are permitted to support different security levels of communicated traffic, such as confidential, restricted, secret etc, or coalition domains, such that each domain 201a-d relates to a particular party of the coalition. The assembly 100 is arranged to configure and monitor various network assets 202 such as a network router or telephone associated with a particular network domain 201a-d to ensure correct operation of the local network 200.

The assembly 100 comprises a first management terminal 101 which is communicatively coupled with a plurality of processors 102a-d via a respective first communications link 103a-d, such as twisted pair of copper cables (not shown). Each of the first communications links 103a-d permit a flow of management traffic from the first management terminal 101 to the respective processor 102a-d, but prevent a flow of management traffic in the opposite direction, namely from the respective processor 102a-d to the first management terminal 101.

The assembly 100 further comprises a second management terminal 104 which is communicatively coupled with each of the plurality of processors 102a-d via a respective second communications link 105a-d, which again may comprise a pair of twisted copper cables (not shown). Each of the second communication links 105a-d permit a flow of management traffic from the respective processor 102a-d to the second management terminal 104, but prevent a flow of management traffic in the opposite direction, namely from the second management terminal 104 to the respective processor 102a-d.

The first management terminal 101 is controlled and operated via a respective first user access terminal 106 which may comprise a monitor 106a and a keyboard 106b for example and is coupled to the first management terminal 101 via a primary communications link 107a, which may comprise two pairs of twisted copper cable (not shown), each pair offering communication along a particular direction. The first user access terminal 106 does not comprise any processing capability since this would potentially allow for a deposit of information relating to the local network 200 at a single location. Instead, the processing facility is provided by a processor (not shown) provided within the first management terminal 101

To enable the operator (not shown) to communicate with the network assets 202, the processors 102a-d are separately communicatively coupled to a domain 201a-d of the network 200 via a respective secondary communications link 109a-d. The secondary communications links 109a-d may similarly comprise two pairs of twisted copper cables (not shown), with each pair offering communication along a particular direction.

In order to plan the local network 200 and configure the assets 202 of the network domains 201a-d, the operator is arranged to provide the required planning and configuration details for the assets 202 to the first management terminal 101, using first user access terminal, via the primary communication link 107a. The planning and configuration instructions are then transmitted to the assets 202 of the respective domains 201a-d at a time determined by the operator (not shown), along the respective first communications link 103a-d, via the respective processor 102a-d and secondary communication links 109a-d.

The processors 102a-d disposed within the first/second communications links 103a-d, 105a-d are further coupled to the first user access terminal 106 via respective further primary communications links 107b-e. Each of the primary communications links 107a-e are coupled at one end thereof to the respective processor/first management terminal 102a-d, 101 and at the other end thereof to a communications switch 108, which enables the operator (not shown) of the first user access terminal 106 to selectively and separately access the first management terminal 101 or one of the processors 102a-d via the respective primary link 107a-e. Accordingly, any debugging of the assets 202 which may be required is achieved by the operator (not shown) by communicating the appropriate instructions along the respective primary communications link 107b-e direct to the respective asset(s) 202 via the respective processor 102a-d and secondary communications link 109a-d.

The assets 202 associated with the domains 201a-d of the local network 200, are collectively monitored via an operator (not shown) of a second user access terminal 110. The second user access terminal 110 comprises a monitor 110a and a keyboard 110b; the associated processing is performed within the second management terminal 104 using a processor (not shown). The second user access terminal is communicatively coupled to the second management terminal 104 via a tertiary communications link 111, which may comprise two pairs of twisted copper cables (not shown) with each pair offering communication along a particular direction. Information relating to the status of the assets 202 associated with each domain 201a-d is communicated along the respective secondary communications link 109a-d to the respective processor 102a-d and onward to the management terminal 104 via the respective second communications link 105a-d. In this respect, the primary, secondary and tertiary links 107a-e, 109a-d, 111 are arranged to support a flow of management traffic in both directions, namely to and from the respective processor 102a-d.

In order that the operator (not shown) of the second user access terminal 110 can determine whether the local network 200 is performing according to the intended configuration, the management configuration traffic which is communicated to the respective domain 201a-d from the first management terminal 101, is also communicated directly to the second management terminal 104 via a third communications link 112 which may comprise a twisted pair of copper cables (not shown), similar to the first and second links 103a-d, 105a-d. Accordingly, the third communications link 112 is arranged to only allow management traffic to pass from the first to the second management terminal 101, 104.

Figure 2:
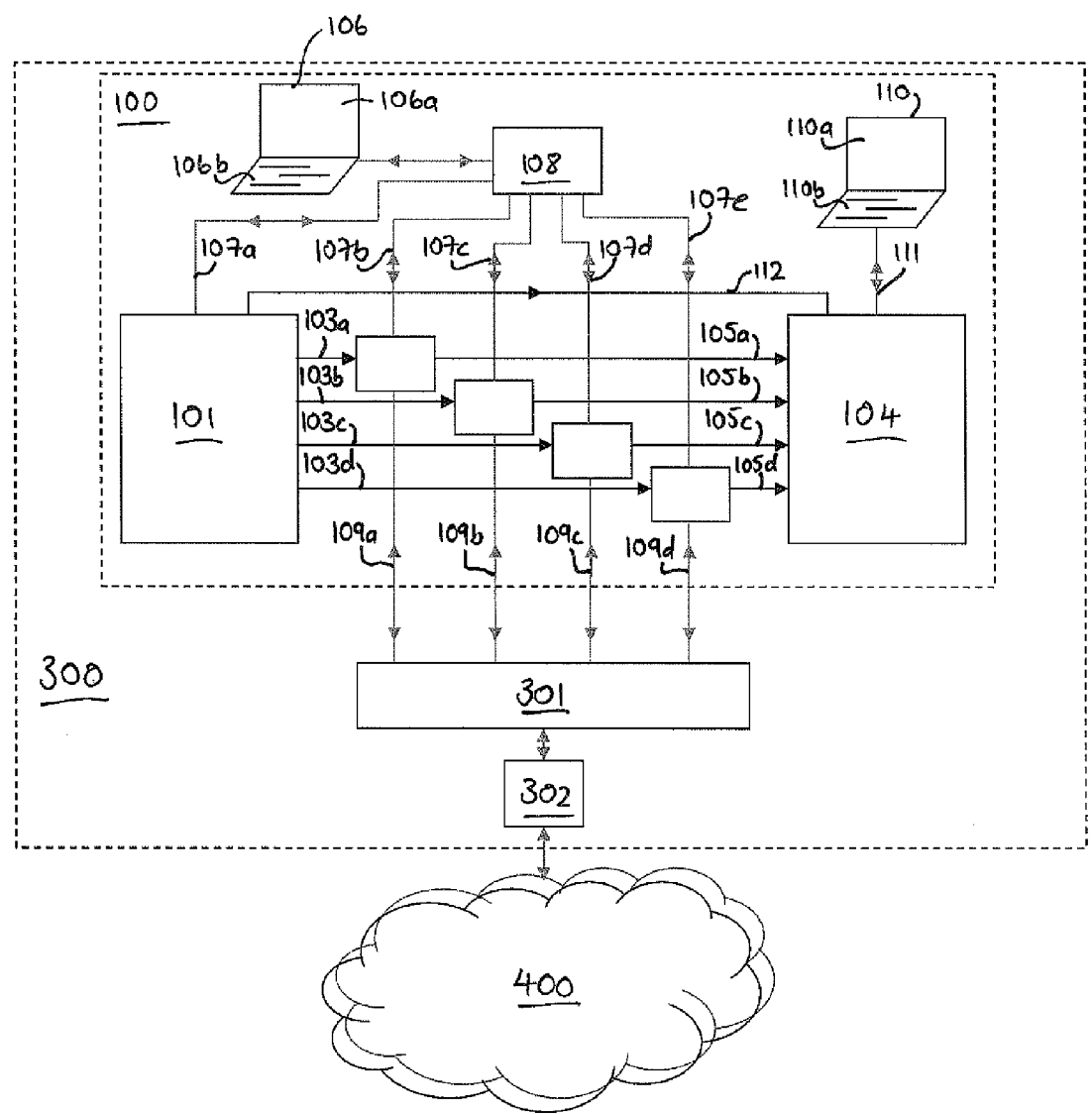
FIG. 2 is a schematic illustration of a network management interface according to an embodiment of the present invention; and, FIG. 3 is a schematic illustration of a management traffic communications network according to an embodiment of the present invention.

Referring to FIG. 2 of the drawings, there is illustrated a network management interface 300 according to an embodiment of the present invention, for managing a flow of network management traffic across a network 400 comprising a plurality of sub-networks 200, each sub-network comprising a plurality of discrete domains (not shown in FIG. 2) associated with the network 400.

The assets (not shown in FIG. 2) associated with the domains (not shown in FIG. 2) of each sub-network 200 are configured and monitored using a local management assembly 100 as described above. The network management interface 300 however, permits a planning, configuring and monitoring of the assets 202 of a domain (not shown in FIG. 2) of a particular sub-network 200, from a location which is remote to the particular sub-network 200. In this manner, the management interface 300 provides a level of redundancy to the entire network 300, such that in the event that a management assembly 100 associated with a particular sub-network 200 fails, then the management interface 300 can further plan, configure, manage and monitor the assets (not shown in FIG. 2) associated with the domains (not shown in FIG. 2) of the particular sub-network 200.

The management interface 300 comprises a management assembly 100 as described above, with the addition however, of a domain separation assembly 301. The secondary communication links 109a-d associated with the assembly 100 of the management interface 300 are coupled to the domain separation assembly 301 which maintains a discrete relation between the management traffic communicated along the respective secondary links 109a-d. The domain separation assembly 301 is further communicatively coupled to a cryptogram device 302 which is arranged to encrypt the management traffic received from the secondary links 109a-d for communication over a network path, which may comprise a satellite link or a commercial communication link (not shown), for example, from one sub-network 200 to another sub-network 200.

Conversely, the domain separation assembly 301 is also arranged to receive management traffic communicated over a network path, decrypt the traffic using the cryptogram device 302, and pass the management traffic to the respective secondary communications link 109a-d for onward transmission to the second management terminal 104 of the assembly 100 associated with the management interface 300.

Figure 3:
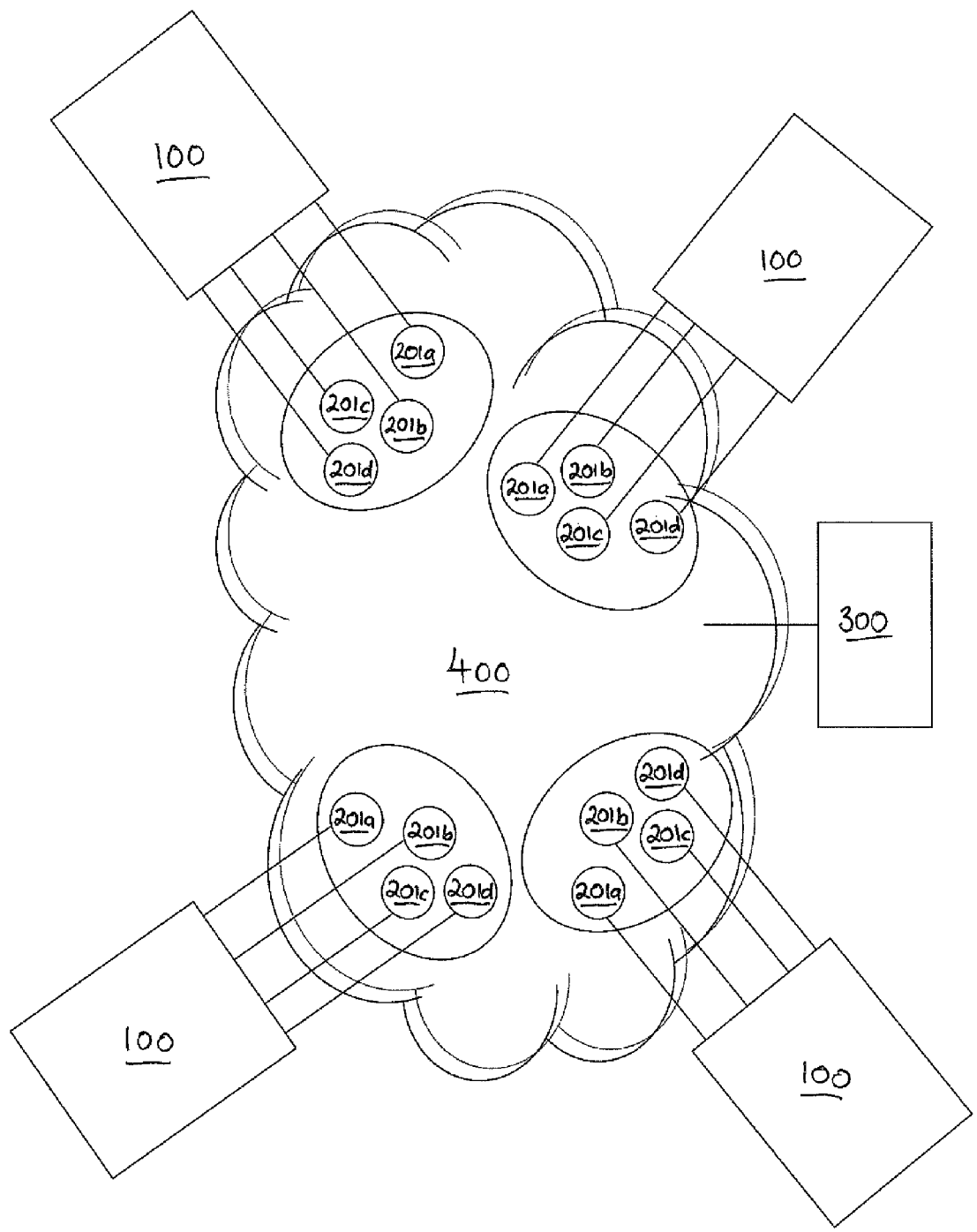

Referring to FIG. 3 of the drawings, there is illustrated a management traffic communications network 400 according to an embodiment of the present invention comprising a plurality of sub-networks 200, with each sub-network 200 comprising a plurality of domains 201a-d, such as security domains. In the embodiment illustrated, the network 400 comprises four sub-networks 200, however, the skilled reader will recognise that the network 400 may comprise an alternative number of sub-networks 200. The sub-networks 200 may comprise command posts for a local area network for example and the assets (not shown in FIG. 3) associated with the various domains 201a-d of each sub-network 200 are configured and monitored using a local management assembly 100 as described above. The respective management assemblies 100 further enable the various sub-networks and thus the assets (not shown in FIG. 3), to communicate with each other over the network 400.

The network 400 further comprises a network management interface 300 as described above, communicatively coupled with the network 400, via a network link which may comprise a physical connection or a wireless connection. However, it is to be appreciated that the network 400 may comprise more than one network interface 300. It is envisaged that the network management interface 300 may be located at a command headquarters and communicatively coupled with one or more of the management assemblies 100 via a satellite link (not shown), for example. Accordingly, the management assembly 100 of each sub-network 200 is arranged to manage the assets (not shown in FIG. 3) of the domains 201a-d of the respective sub-network 200, while the network management interface 300 is arranged to manage the assets (not shown in FIG. 3) of the entire network 400 remotely, and provides a level of management redundancy in the event that one or more of the management assemblies 100 associated with the sub-networks 200 fails.

In a further embodiment which is not illustrated, the first management terminal 101 of each of the management assemblies 100 of the network 400 may be communicatively coupled, so that a first management terminal 101 of one assembly 100 may instruct a further first management terminal 101 of the respective further assembly 100 with the planning of the respective further sub-network 200 and configuration of the assets 202 associated with the further sub-network 200. Similarly, the second management terminal 104 of each of the management assemblies 100 may be communicatively coupled, so that a second management terminal 104 of one assembly 100 may receive information relating to the status of the assets 202 of a further sub-network 200 from the respective further second management terminal 104.

This embodiment therefore allows communication between the management assemblies 100 over the network 400, but in order to plan and configure the assets 202 of the further sub-network 200, the first management terminal 101 of the management assembly 100 of the further sub-network 200 must be operational. Similarly, in order to monitor the assets 202 of the further sub-network 200, the respective further second management terminal 104 must be operational.

In contrast, the network management interface 300 can plan, configure and monitor the assets 202 of the sub-networks 200, regardless of the operational state of the respective management assembly 100, by communicating directly with the required domains 201a-d of the sub-network 200.

From the foregoing therefore, it is evident that the network management assembly and network management interface provide for a secure and resilient communications network.

The invention claimed is:

1. A network management assembly for managing a flow of network management traffic across a network having a plurality of discrete network domains, the assembly comprising:
 a first management terminal which is configured to transmit network management traffic relating to a configuration of assets from the first management terminal to a respective domain to each of the network domains via respective links in a first group of communication links; and
 a second management terminal which is configured to receive network management traffic relating to a status of assets from each of the network domains via respective links in a second group of communication links;
 each of the links in the first group of communication links being configured to permit a flow of network management traffic from the first management terminal to a respective one of the network domains and to prevent a flow of network management traffic from the respective one of the network domains to the first management terminal, each of the links in the second group of communication links being configured to permit a flow of network management traffic from a respective one of the network domains to the second management terminal and prevent a flow of network management traffic from the second management terminal to the respective one of the network domains;

wherein each of the links in the first group of communication links is configured to pass management traffic relating to a configuration of assets from the first management terminal to a respective domain; and wherein each of the links in the second group of communication links is configured to pass management traffic relating to a status of assets from a respective domain to the second management terminal.

2. An assembly according to claim 1 wherein the second management terminal is configured to monitor the status of the assets associated with each network domain to provide a global status of the assets associated with the network.

3. An assembly according to claim 1, wherein the first management terminal is communicatively coupled with the second management terminal via a third communications link.

4. An assembly according to claim 3, wherein the third communications link permits a flow of specified management traffic from the first management terminal to the second management terminal but prevents a flow of the specified management traffic from the second management terminal to the first management terminal.

5. An assembly according to claim 1, wherein each of the links in the first and second group of communication links comprises: a processor having a memory for buffering a flow of management traffic along each respective link.

6. An assembly according to claim 1, comprising: first and second user access terminals communicatively coupled with the first and second management terminals, respectively.

7. An assembly according to claim 6, wherein the first user access terminal is further communicatively coupled with each of the processors.

8. An assembly according to claim 6, comprising: a switch which is arranged to separately and selectively enable a user to separately communicatively couple the first user access terminal with the first management terminal or one of the processors.

9. An assembly according to claim 1, comprising: a domain separation assembly which is configured to receive management traffic from one or more of the network domains and communicate management traffic along each respective second communications link associated with the domain to the second management terminal.

10. An assembly according to claim 9, wherein the domain separation assembly is configured to receive management traffic from one or more of the first communication links for subsequent transmission to a respective network domain.

11. An assembly according to claim 1, wherein each of the second communication links is configured to pass management traffic relating to a status of assets from a respective domain to the second management terminal.

12. An assembly according to claim 11, wherein the second management terminal is configured to monitor the status of the assets associated with each network domain to provide a global status of the assets associated with the network.

13. An assembly according to claim 12, wherein the first management terminal is communicatively coupled with the second management terminal via a third communications link.

14. An assembly according to claim 13, wherein each of the links in the first and second group of communication links comprises: a processor having a memory for buffering a flow of management traffic along each respective link.

15. An assembly according to claim 14, comprising: first and second user access terminals communicatively coupled with the first and second management terminals, respectively.

16. A network management interface for managing a flow of network management traffic across a network having a plurality of sub-networks, each sub-network containing a plurality of discrete domains associated with the network, the interface comprising:
a network management assembly according to claim 1; and,
a domain separation assembly which is configured to receive management traffic from the network domains of the sub-networks and communicate management traffic along each respective second communications link to the second management terminal, and which is configured to receive management traffic from one or more of the first communication links for subsequent transmission to each respective network domain associated with a sub-network.

17. A management traffic communications network, the network having a plurality of sub-networks, each sub-network containing a plurality of domains associated with the network, each sub-network comprising:
a network management interface according to claim 16, which is communicatively coupled with at least one network management assembly associated with each sub-network to configure and monitor assets associated with domains of each respective sub-network, the network management interface being provided for configuring and monitoring assets associated with the domains of each network.

18. A network according to claim 17, wherein the network domains comprise security domains.

* * * * *